United States Patent
Horne

(10) Patent No.: US 6,925,300 B2
(45) Date of Patent: Aug. 2, 2005

(54) METHOD, APPARATUS, AND SYSTEM FOR REMOTE DIAGNOSIS USING A WIRELESS LINK

(75) Inventor: David M. Horne, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 659 days.

(21) Appl. No.: 09/968,406

(22) Filed: Sep. 28, 2001

(65) Prior Publication Data

US 2003/0064719 A1 Apr. 3, 2003

(51) Int. Cl.$^7$ .............................. H04M 1/24; H04Q 7/20
(52) U.S. Cl. ......................... 455/423; 379/9; 379/1.01; 379/29.01
(58) Field of Search ................................ 455/423, 424, 455/63, 9, 10, 67.1; 379/9, 9.01, 1.01, 14.01, 22.02, 27.01, 29.01

(56) References Cited

U.S. PATENT DOCUMENTS 6,580,906 B2 * 6/2003 Bilgic et al. ............. 455/422.1
6,741,857 B1 * 5/2004 Warden et al. ............. 455/423
6,782,256 B2 * 8/2004 Engholm et al. ........... 455/423

* cited by examiner

Primary Examiner—Rexford Barnie
(74) Attorney, Agent, or Firm—Blakely, Sokoloff, Taylor & Zafman LLP

(57) ABSTRACT

According to one aspect of the invention, a method is provided in which a connection is established, via a first wireless network, between a first wireless device located at a first location and a diagnostic control unit located at a second location. The first wireless device is coupled to an equipment at the first location the operations of which to be remotely tested by the diagnostic control unit. One or more diagnostic requests are transmitted, via the first wireless network, from the diagnostic control unit to the equipment through the first wireless device to perform one or more diagnostic operations on the equipment. The requested diagnostic operations are performed on the equipment to generate diagnostic results.

29 Claims, 4 Drawing Sheets

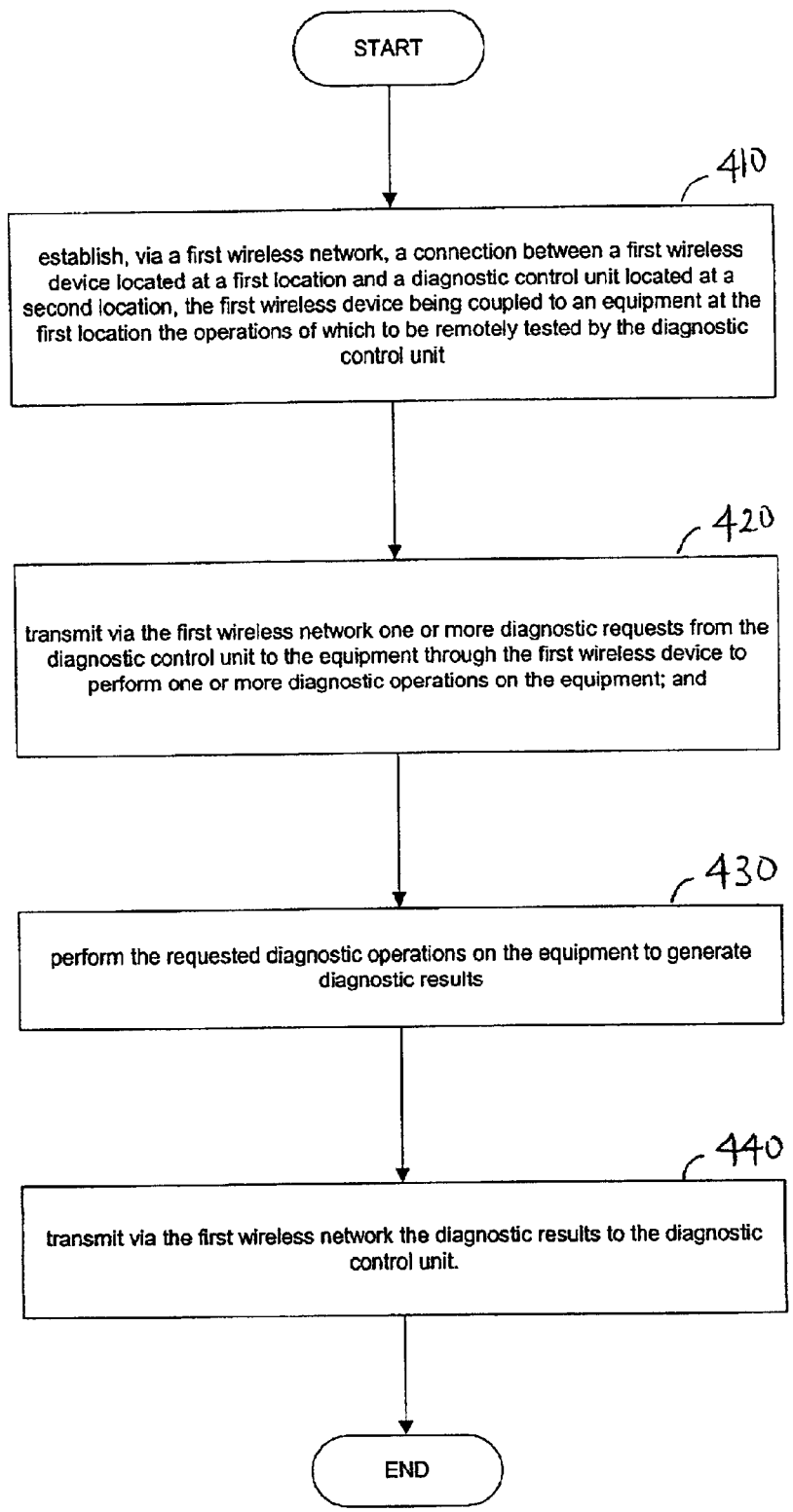

METHOD, APPARATUS, AND SYSTEM FOR REMOTE DIAGNOSIS USING A WIRELESS LINK

FIELD OF THE INVENTION

The present invention relates to the field of networking. More specifically, the present invention relates to a method, apparatus, and system for remote diagnosis of network problems using a wireless link.

BACKGROUND OF THE INVENTION

As technology continues to advance and the demand for access to information stored on computers connected to various networks continues to increase, network providers and network operators including traditional dial-up Internet service providers (ISPs), cable service providers, DSL service providers, etc., have continued to face more and more challenges in providing effective and efficient customer services including timely and cost-effective resolutions of problems experienced by their network customers or subscribers. Generally, the outside plant (also called network facility or network plant) for a network provider or network operator (e.g., cable or telephony data network operator) usually includes the various equipments and cabling that are not located within the residence of a user or subscriber. The outside plant may include cabling buried in the utility right-of-way on the subscriber's property, as well as any hardware attached to the outside of the property. Problems that occur in the outside plant may preclude the network operator or network provider from obtaining diagnostic data from the subscriber, for example, due to a failure of an equipment or cabling anywhere in the outside plant datapath). However, diagnostic data initiated from the subscriber side is generally valuable in isolating the location and cause of the problem since it allows the problem to be tracked from two sides. Furthermore, a network problem that is visible from the subscriber perspective may not be visible from the network operator's remote perspective because not all points in the outside plant are addressable or that they are not reachable via the common outside plant path.

Currently, such problems experienced by a subscriber are addressed by having the subscriber call the network operator's technical support and attempt to describe the problem. The technical support personnel then attempts to guide the subscriber or user through various network tests and settings of the subscriber's equipment (e.g., a cable modem, a DSL modem, etc.) and/or the subscriber's computer coupled to the subscriber's equipment. This is done typically in order to assess the problem more definitively than to rely on the problem description provided by the subscriber. This traditional or conventional process of network troubleshooting via landline voice connection is neither effective nor efficient. Subscribers often report secondary or irrelevant effects or symptoms that mask the true problem. Network technicians generally attempt to understand the problem based on the user's descriptions but the user generally does not have sufficient networking background and is not very familiar with various computer concepts and terminology. In order to trust that the subscriber is performing and interpreting the requested instructions and operations correctly, the technician often will run redundant and circular test processes. Even after such redundant tests, the technician may not be able to make much progress with the problem diagnosis and resolution. Consequently, the technician may have to recommend a truck roll (e.g., service call) so the problem can be seen first hand at the subscriber's location. In these cases, the field service technician will spend the first portion of the service call to run tests directly from the equipment and/or computer of the subscriber. Such a method for troubleshooting or solving problems is therefore ineffective and inefficient.

BRIEF DESCRIPTION OF THE DRAWINGS

The features of the present invention will be more fully understood by reference to the accompanying drawings, in which:

FIG. 4 shows a flow diagram of one embodiment of a method according to teachings of the present invention.

DETAILED DESCRIPTION

In the following detailed description numerous specific details are set forth in order to provide a thorough understanding of the present invention. However, it will be appreciated by one skilled in the art that the present invention may be understood and practiced without these specific details.

Figure 1:
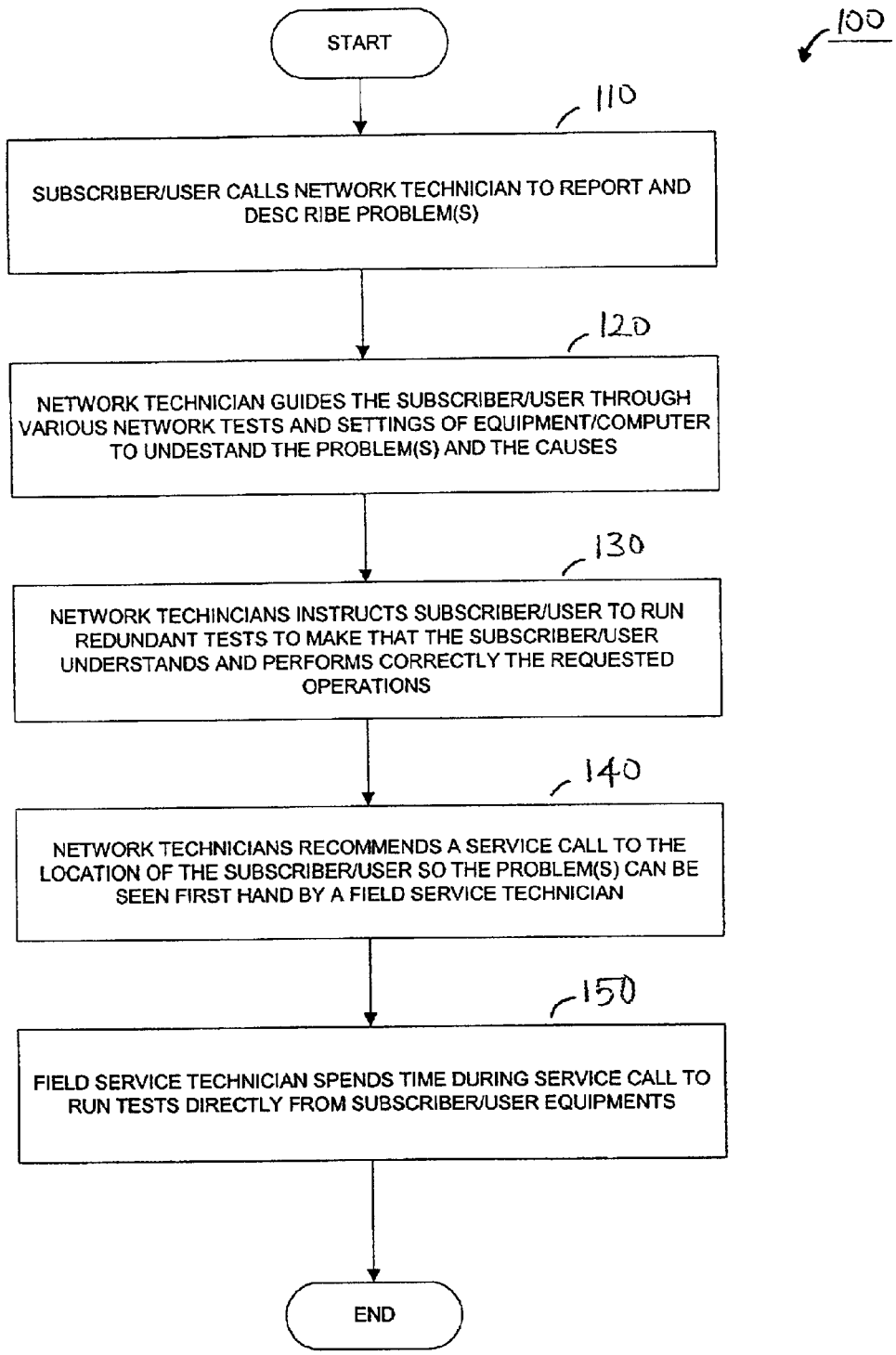
FIG. 1 shows a flow diagram of a conventional or traditional process of network troubleshooting.

FIG. 1 shows a flow diagram of a conventional or traditional process of network troubleshooting. At block 110, a subscriber or user who experiences problem(s) with his or her network equipment (e.g., a cable modem, DSL modem, set-top box, etc.) calls the network operator technical support personnel (e.g., network technician) to report and describe the problems. At block 120, the network technician guides the subscriber through various network tests and/or various settings of the subscriber's equipments (e.g., modem, computer, etc.) to understand the problems and the causes thereof. At block 130, the network technician instructs the subscriber to run redundant and circular tests to make sure that the subscriber understands and performs correctly the requested testing operations. At block 140, assuming that that network technician and the subscriber are unable to resolve the problems, the network technician then recommends a truck roll (service call) to the location of the subscriber so that the problems can be seen first hand by a field service technician. At block 150, after arriving at the subscriber's location, the field service technician usually spends the first portion of the service call to run tests directly from the subscriber's equipments to identify the problems and the causes thereof. As explained above, a network troubleshooting process via landline voice connection as described in FIG. 1 is inefficient and ineffective because the subscriber generally lacks sufficient networking background to be able to accurately describe the problems and/or to perform correctly the requested operations. Furthermore, redundant tests need to be performed so that the network technician can trust that the subscriber understands and correctly follows the instructions. In addition, the field service technician still has to repeat the tests at the subscriber's location.

Figure 2:
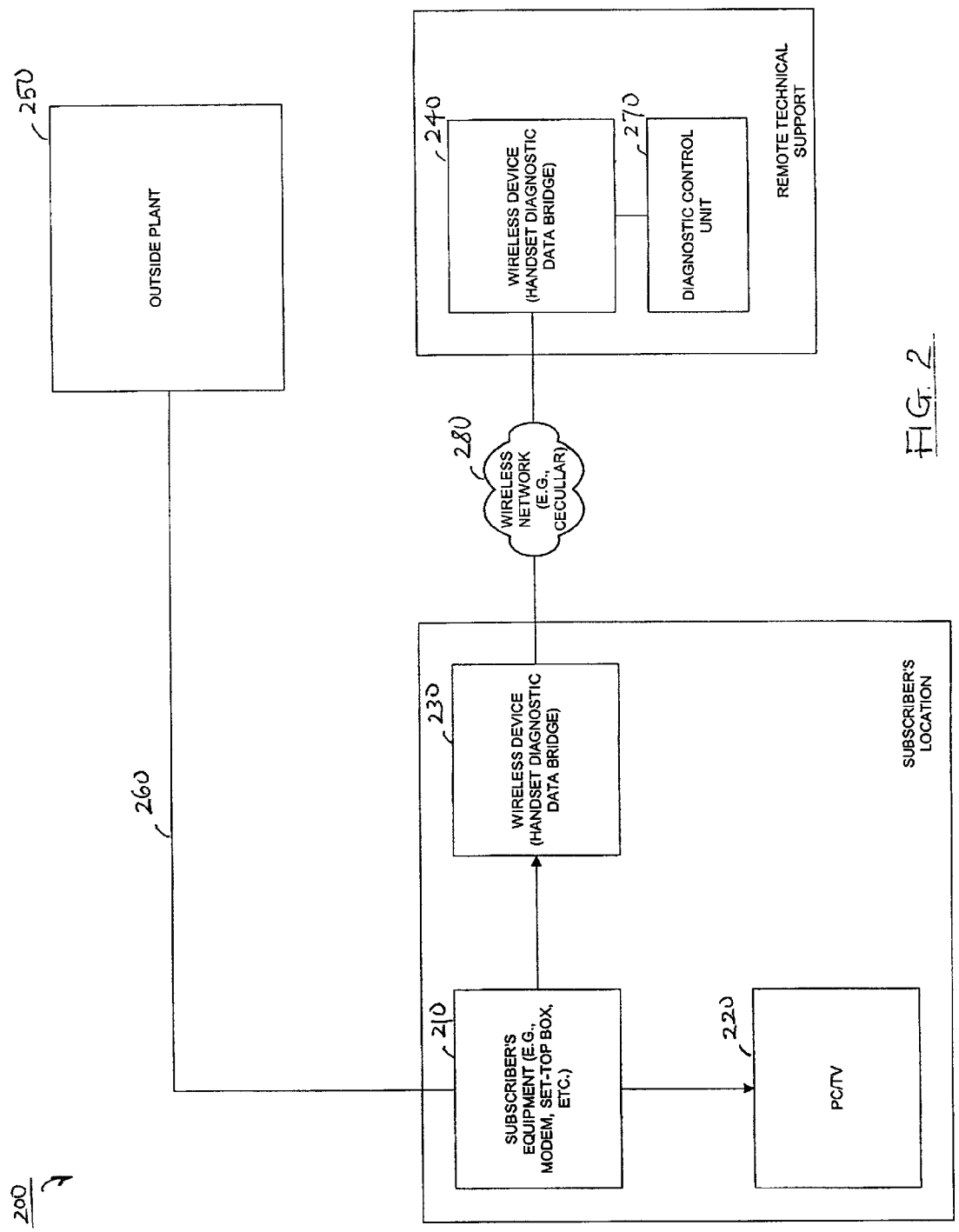
FIG. 2 is a block diagram of one embodiment of a system configuration in which the teachings of the present invention may be implemented.

FIG. 2 is a block diagram of one embodiment of a system configuration 200 in which the teachings of the present invention may be implemented. As shown in FIG. 2, the system configuration includes a subscriber's equipment 210 (e.g., a cable modem, DSL modem, a set-top box (STB), etc.) that is coupled to a computer or another device 220 that is capable of displaying information such as diagnostic results (e.g., a TV set) to a subscriber or user during testing or diagnosis of the equipment 210. The subscriber's equipment 210 is coupled via a wired or wireless link to a wireless device 230 that is capable of transmitting and receiving both voice and data. In one embodiment, the wireless device 230 can be used to transmit and receive both voice and data to/from another wireless device 240 that is coupled to a diagnostic control device or unit 270 located remotely from the subscriber's location, via a wireless network 280. In one embodiment, as described in more details below, the wireless device 230 (also called the handset diagnostic data bridge or HDDB herein) can be a full function personal communication system (PCS) or digital cellular phone with additional capabilities for data transmission and a diagnostic port for linking to a corresponding diagnostic port on the subscriber's equipment 210. As illustrated in FIG. 2, the subscriber's equipment 210 is usually connected to an outside plant 250 (also called network facility or network plant) of a network service provider or network operator via the network path 260. As described in more details below, a remote diagnostic method in accordance with the teachings of the present invention can be utilized to perform remote diagnosis of the various functions and capabilities of the subscriber's equipment 210, as well as performing network-side tests to determine whether there are problems with the outside plant 250.

If there is in fact a problem with the outside plant 250, the remote diagnostic process as described herein can be performed over the wireless network 280 that is uncorrelated to the network operator's outside plant 250. While running remote diagnostics over the same outside plant may be possible in some cases, depending on the nature of the problem, it would be much more effective to isolate the problem by performing the remote diagnostics over a network that is uncorrelated to the outside plant 250. Accordingly, the present invention provides for a method of testing directly from a user's perspective that is viewable remotely by technical support personnel (e.g., network technician) that significantly improves the efficiency and effectiveness of the network troubleshooting process. This will allow the technical support personnel to see for themselves the various scenarios described by the user or subscriber while avoiding the time spent in guiding or describing the various tests and/or settings they want the user to perform. Even if a truck roll or service call is deemed necessary after performing the remote-initiated diagnostics as described herein, the user may not need to be available for the service call since the various tests or procedures that the field service technician would need to run directly from the user' equipments would have already been performed prior to the service call. Accordingly, this would reduce the total time spent by the field service technician on a service call.

Figure 3:
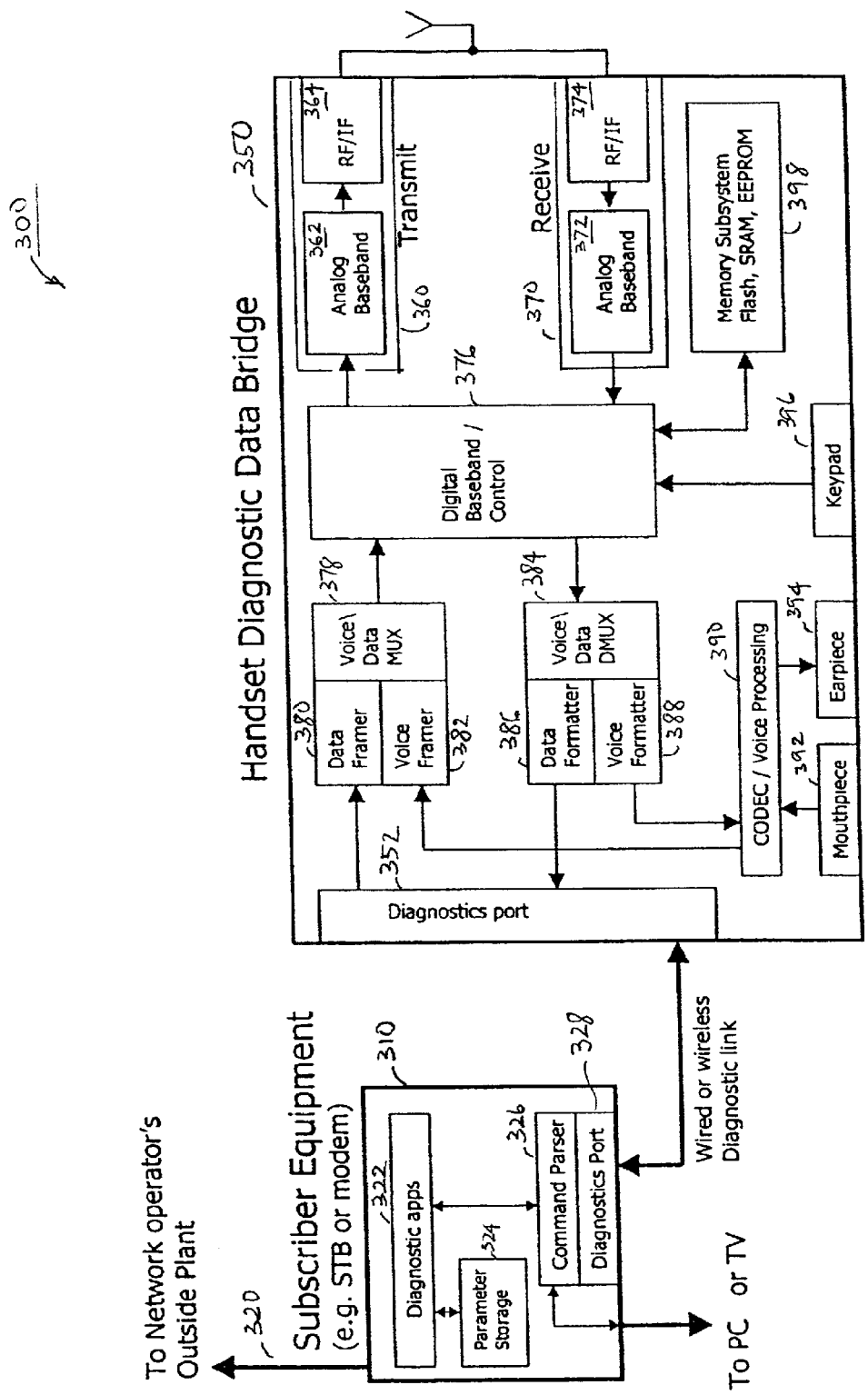
FIG. 3 illustrates a block diagram of a diagnostic wireless service system configuration in accordance with one embodiment of the present invention.

FIG. 3 illustrates a block diagram of a diagnostic wireless service system configuration 300 in accordance with one embodiment of the present invention. In one embodiment, the diagnostic wireless service system 300 utilizes a wireless communication link via a wireless network (e.g., a cellular/PCS communication link) between the service provider's technical support at a remote location (may be in a different state) and the subscriber's equipment. The cellular/PCS communication link is also referred to as diagnostic wireless service (DWS) herein. Since the operations of the wireless network (e.g., the cellular network) and the service provider's outside plant are uncorrelated, it is highly unlikely that both networks would experience outages or problems simultaneously.

As shown in FIG. 3, the subscriber equipment 310 (e.g., modem or set-top box, etc.) is typically connected to a network operator's outside plant via a network path 320. In one embodiment, the subscriber equipment 310 may include one or more diagnostic applications 322 that can be activated or run to perform various tests or diagnostic processes in order to test the various functions and capabilities of the subscriber equipment 310. For example, the diagnostic applications 322 can be designed and configured to perform tests with respect to the transmitting and receiving functions of the subscriber equipment 310. In one embodiment, the subscriber equipment 310 further includes a parameter storage unit 324 that is used to store various parameters that are used for the various tests. In one embodiment, the subscriber equipment 310 also includes a command parser 326 and a diagnostic port 328. Generally, the subscriber equipment 310 can be coupled to a computer or a television set. For example, if the subscriber equipment 310 is a modem, it can be coupled or connected to a computer. In one embodiment, if the subscriber equipment 310 is a modem, part or all of the diagnostic applications may reside on the computer. If the subscriber equipment is a set-top box, the television set may be used to display results of the remote test to the user.

As shown in FIG. 3, the diagnostic wireless service system 300 includes a wireless device 350 (also called the handset diagnostic data bridge or HDDB herein) that is coupled to the subscriber equipment 310 via a wired or wireless diagnostic link 330 that connects a diagnostic port 352 on the wireless device 350 with the diagnostic port 328 on the subscriber equipment 310. The wireless device 350 includes a transmitter 360 and a receiver 370. The transmitter 360, in one embodiment, includes an analog baseband unit 362 and a RF/IF unit 364. The receiver 370, in one embodiment, includes analog baseband unit 372 and a RF/IF unit 374. As shown in FIG. 3, the wireless device 350 further includes a digital baseband and control unit 376 coupled to the analog baseband 362, the analog baseband 372, a voice and data mutiplexer 378, and a voice and data multiplexer 384. The voice/data multiplexer 378 is coupled to a data framer 380 and a voice framer 382. The voice/data multiplexer 384 is coupled to a data formatter 386 and a voice formatter 388. In one embodiment, the voice formatter 388 is coupled to a CODEC/voice processing unit 390 which is coupled to a mouthpiece 392 and an earpiece 394. The digital baseband and control unit 376 is also coupled to a keypad 396 and a memory subsystem 398.

In one embodiment, voice and data communications between the wireless device 350 and technical support personnel at a remote location is established using a wireless communication link (e.g., cellular/PCS communication link). In one embodiment, the technical support personnel at the remote location also uses a wireless device having the same or similar configuration and functions as those of the wireless device 350 to transmit and receive both voice and data to/from the wireless device 350. Accordingly, in one embodiment, the wireless communication link between the wireless device 350 and the technical support personnel is a dual-function voice and data link and the wireless device 350 serves a bridge between the wireless and the wired networks. In one embodiment, the data can be either encoded and multiplexed with the voice stream or it can be placed on a separate channel dedicated to data transmission. In one embodiment, the separate channel is not limited to a frequency channel and can be a time-multiplexed channel or an orthogonal-code-multiplexed channel within the same frequency band as the voice.

In one embodiment, a subscriber or user who experiences problem(s) with the equipment 310 can call and establish connection with technical support personnel (e.g., a network technician) at a remote location using the wireless device 350. While communicating via voice with the subscriber or user, the technical support personnel can simultaneously launch or initiate diagnostic applications 322 to diagnose the various functions and operations of the equipment 310, for example, by sending diagnostic commands and/or diagnostic data via the wireless device to the equipment 310 over the diagnostic link 330. In addition, the technical support personnel can run specific tests or queries of network data and receive diagnostic results back via the wireless device 350. In one embodiment, the remote-initiated testing process as described herein is transparent to the subscriber/user and happens simultaneously and transparently with their voice communication. Whether the separate channel or the encoded/multiplexed approach is used, the data channel is distinguished from the voice by the capabilities of the wireless device 350 and is not heard as "modem noise" by the subscriber/user.

With the method provided by the present invention, the technical support personnel can run various tests and procedures directly from a remote location and does not have to rely on the user's interpretation or description of the problem. The technical support personnel can see the diagnostic results as the field service technician would during a truck roll service call, without the need for the field service technician to view the problem at the subscriber's location. If a service call is still necessary, then upon completion of the service call, the field service technician can validate or verify the fix or resolution via the DWS link, in which case the user can be asked to switch the wireless device 350 into auto-attended mode if the user will not be available.

In addition to being able to run tests from the user side, the technical support personnel can also run network-side tests. This double-ended approach allows problems to be quickly isolated or boxed in, which helps the technical supports personnel more accurately identify the location and cause of the problem. In one embodiment, the diagnostic wireless service as described herein can also be used as a redundant phone service for backup purposes. The diagnostic wireless service and its operation over an uncorrelated wireless network (e.g., cellular network) greatly increase the probability that a phone service would be available to the user when he needs it.

FIG. 4 illustrates a flow diagram of one embodiment of a method in accordance with the teachings of the present invention. At block 410, a connection is established, via a first wireless network, between a first wireless device located at a first location (e.g., the subscriber's location) and a diagnostic control unit or device (e.g., used by the technical support personnel to diagnose problems) located at a second location (e.g., the remote technical support location). The first wireless device is coupled to an equipment located at the first location the operations/functions of which to be remotely tested or diagnosed by the diagnostic control unit. At block 420, one or more diagnostic messages or requests (e.g., diagnostic commands) are transmitted via the first wireless network from the diagnostic control unit to the equipment through the first wireless device to perform one or more diagnostic operations on the equipment. At block 430, the requested diagnostic operations are performed to generate diagnostic results. At block 440, the diagnostic results are sent to the diagnostic control unit by the first wireless device via the first wireless network.

The invention has been described in conjunction with the preferred embodiment. It is evident that numerous alternatives, modifications, variations and uses will be apparent to those skilled in the art in light of the foregoing description.

What is claimed is:

1. A method comprising:
    establishing via a first wireless network a connection between a first wireless device located at a first location and a diagnostic control unit located at a second location, the first wireless device being coupled to subscriber equipment connected to an outside plant via a network path at the first location, the first wireless network being uncorrelated to the outside plant, the operations of the outside plant to be remotely tested by the diagnostic control unit using both voice communication and data diagnostic request information transmitted on the first wireless network;
    transmitting via the first wireless network one or more diagnostic requests from the diagnostic control unit to the subscriber equipment through the first wireless device to perform one or more diagnostic operations on the subscriber equipment with respect to the outside plant; and
    performing the requested diagnostic operations on the subscriber equipment to generate diagnostic results.

2. The method of claim 1 further including:
    transmitting via the first wireless network the diagnostic results to the diagnostic control unit.

3. The method of claim 1 wherein the first wireless network is selected from the group consisting of an analog cellular network, a digital cellular network, a personal communication services (PCS) network, a paging communication network, and a global system for mobile communications (GSM) network.

4. The method of claim 1 wherein the one or more diagnostic requests include one or more diagnostic commands to initiate one or more diagnostic applications to test various operations of the outside plant.

5. The method of claim 1 wherein the first wireless device is coupled to the subscriber equipment via a wireless link.

6. The method of claim 1 wherein the first wireless device is coupled to the subscriber equipment via a wired link.

7. The method of claim 1 wherein the subscriber equipment is a modem coupled to a computer.

8. The method of claim 1 wherein the subscriber equipment is a set-top box coupled to a television set.

9. The method of claim 1 wherein the first wireless device and the subscriber equipment each includes a communication port for transmission of information between the first wireless device and the subscriber equipment.

10. The method of claim 1 further including:
    transmitting via the first wireless network one or more network test requests from the diagnostic control unit to the subscriber equipment through the first wireless device to test the operational capability of a communication line coupling the subscriber equipment to a network facility of a network service provider located remotely from the first location.

11. The method of claim 1 further including:
    communicating via the first wireless network voice messages in a voice stream between the first wireless device at the first location and the diagnostic control unit at the second location.

12. The method of claim 11 wherein diagnostic data are encoded and multiplexed with the voice stream.

13. The method of claim 11 wherein diagnostic data are placed on a separate channel designated for data transmission.

14. The method of claim 13 wherein the separate channel is selected from the group consisting of a frequency channel, a time-multiplexed channel, or an orthogonal-code-multiplexed channel within the same frequency band as the voice stream.

15. An apparatus comprising:
    subscriber equipment connected to an outside plant via a network path; and
    a wireless device coupled to the subscriber equipment and a wireless network that is uncorrelated to the outside plant, the wireless device further including a receiver to receive, via the wireless network, both voice communication and data diagnostic request information from a diagnostic control unit located at a remote location, the data diagnostic request information being used to initiate one or more diagnostic operations on the subscriber equipment with respect to the outside plant, and a transmitter to transmit both voice communication and data diagnostic results received from the subscriber equipment to the diagnostic control unit at the remote location via the wireless network.

16. The apparatus of claim 15 wherein the wireless device is coupled to the subscriber equipment by a wireless link.

17. The apparatus of claim 15 wherein the wireless device is coupled to the subscriber equipment by a wired link.

18. The apparatus of claim 15 wherein the wireless device is coupled to the subscriber equipment by a dual-function voice and data link.

19. The apparatus of claim 15 wherein, in response to the data diagnostic request information, one or more diagnostic operations are performed on the subscriber equipment to generate diagnostic results with respect to various operational capabilities of the outside plant.

20. The apparatus of claim 15 wherein data diagnostic information are encoded and multiplexed with the voice communication.

21. The apparatus of claim 15 wherein data diagnostic information are placed on a separate channel designated for data transmission.

22. The apparatus of claim 15 wherein the wireless network is selected from the group consisting of an analog cellular network, a digital cellular network, a personal communication services (PCS) network, a paging communication network, and a global system for mobile communications (GSM) network.

23. A system comprising:

a communication device located at a first location, the communication device connected to an outside plant via a network path;

a diagnostic control unit located remotely from the communication device to diagnose the operations of the outside plant; and a wireless apparatus coupled to the communication device to provide a diagnostic interface between the communication device and the diagnostic control unit, the wireless apparatus to communicate with the diagnostic control unit via a wireless network that is uncorrelated to the outside plant, the wireless apparatus to transmit one or more diagnostic requests that are received from the diagnostic control unit to the communication device to initiate one or more diagnostic operations with respect to the outside plant, and the wireless apparatus to transmit diagnostic results received from the communication device to the diagnostic control unit.

24. The system of claim 23 wherein the wireless apparatus includes:

a receiver to receive, via the wireless network, diagnostic request information from the diagnostic control unit, the diagnostic request information being used to initiate one or more diagnostic operations with respect to the outside plant;

a diagnostic port to establish a communication link between the wireless apparatus and the communication device, the communication link being used to transmit information between the wireless apparatus and the communication device; and a transmitter to transmit diagnostic results received from the communication device to the diagnostic control unit at the remote location via the wireless network.

25. The system of claim 24 wherein, in response to the diagnostic request information, one or more diagnostic operations are performed on the communication device to generate diagnostic results with respect to various operational capabilities of the outside plant.

26. The system of claim 24 wherein, in addition to diagnostic information, voice messages are transmitted in a voice stream between the wireless apparatus and the diagnostic control unit via the wireless network.

27. A machine-readable medium comprising instructions which, when executed by a machine, cause the machine to perform operations including:

establishing via a first wireless network a connection between a first wireless device located at a first location and a diagnostic control unit located at a second location, the first wireless device being coupled to subscriber equipment connected to an outside plant via a network path at the first location, the first wireless network being uncorrelated to the outside plant, the operations of the outside plant to be remotely tested by the diagnostic control unit;

transmitting via the first wireless network one or more diagnostic requests from the diagnostic control unit to the subscriber equipment through the first wireless device to perform one or more diagnostic operations on the subscriber equipment with respect to the outside plant;

performing the requested diagnostic operations on the subscriber equipment to generate diagnostic results; and transmitting via the first wireless network the diagnostic results to the diagnostic control unit.

28. The machine-readable medium of claim 27 further including:

transmitting via the first wireless network one or more network test requests from the diagnostic control unit to the subscriber equipment through the first wireless device to test the operational capability of a communication line coupling the subscriber equipment to a network facility of a network service provider located remotely from the first location.

29. The machine-readable medium of claim 27 further including:

communicating via the first wireless network voice messages in a voice stream between the first wireless device at the first location and the diagnostic control unit at the second location.

\* \* \* \* \*